Aug. 19, 1924.
S. R. BERGMAN ET AL
1,505,619
ALTERNATING CURRENT MOTOR
Filed Aug. 8, 1921
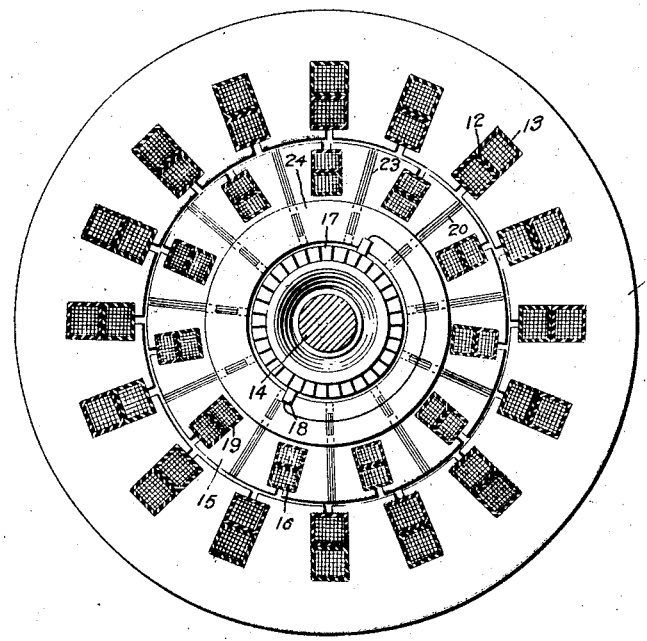
Fig. 1.
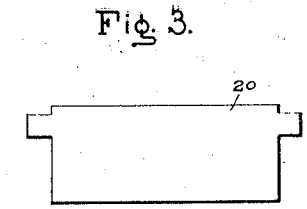
Fig. 3.
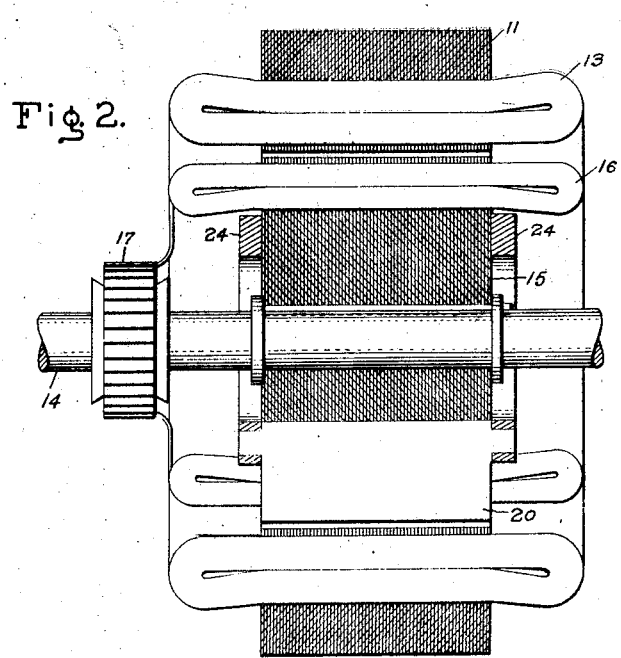
Fig. 2.
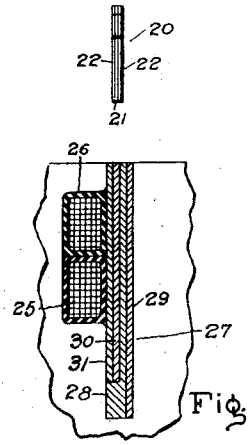
Fig. 4.
Fig. 5.
Inventors:
Sven R. Bergman,
Alfred F. Welch,
by Albert G. Davis
Their Attorney Patented Aug. 19, 1924.

1,505,619

UNITED STATES PATENT OFFICE.

SVEN R. BERGMAN, OF NAHANT, MASSACHUSETTS, AND ALFRED F. WELCH, OF FORT WAYNE, INDIANA, ASSIGNORS TO GENERAL ELECTRIC COMPANY, A CORPORATION OF NEW YORK.

ALTERNATING-CURRENT MOTOR.

Application filed August 8, 1921. Serial No. 490,482.

*To all whom it may concern:*

Be it known that we, SVEN R. BERGMAN, a subject of the King of Sweden, residing at Nahant, county of Essex, State of Massachusetts, and ALFRED F. WELCH, a citizen of the United States, residing at Fort Wayne, county of Allen, State of Indiana, have invented certain new and useful Improvements in Alternating-Current Motors, of which the following is a specification.

This invention relates to an alternating current motor, and more particularly to a single phase commutator motor having desirable starting and running characteristics.

It is well known that a single phase commutator motor whether fed conductively or inductively does not have a limited speed. To limit the speed of such a motor it has been proposed to provide a squirrel cage winding on the secondary or movable member of the commutator motor. Such a motor has a tendency to run at speed near synchronism and the speed variation due to variation of load is comparatively slight. In the ordinary arrangement of a commutator motor with a squirrel cage winding there is however objectionably high starting current as well as low starting torque. It is the main object of our invention to make it possible to start a commutator motor, such for example as a repulsion motor, with a low starting current and a high torque. We obtain this effect by a proper construction of the squirrel cage winding on the secondary member of the motor. The squirrel cage winding as used by us comprises conductors which have a relatively high resistance when starting and a relatively low resistance when running. Due to the low resistance during the running condition the speed of the motor cannot rise much above synchronism. At the same time the reactance of the windings is low during the running condition so that the power factor of the current supplied to the motor is high.

For a better understanding of our invention reference is to be had to the following description together with the accompanying drawings, in which Fig. 1 shows the primary and secondary members of the motor built in accordance with our invention with the conductors making up the windings in cross section; Fig. 2 is a longitudinal sectional view of the operating parts of the motor; Fig. 3 is a side view of one of the conductors making up the squirrel cage winding; Fig. 4 is an end view of the same; and Fig. 5 is a cross section of a portion of the secondary member showing a modified form of slots and conductors used thereon.

Referring now more in detail to the drawings, in which like reference characters refer to like parts throughout, the stator or primary member 11 is supplied with slots 12 and windings 13 therein. The arrangement of the windings, as well as the particular construction of the stator member, may be of any well known form since these constitute no part of our invention. Located within the stator 11 and mounted on the shaft 14 of the motor is the secondary member or rotor 15 which is preferably made up of laminations appropriately clamped to the shaft 14, as shown in Fig. 2. The secondary member 15 carries a commuted definite coil winding 16. The commutator 17 is electrically connected thereto and a pair of brushes 18, if a bi-polar motor is used, is placed upon the commutator 17 and are short circuited in an axis displaced from the axis of the windings on the stator or primary member 11. As thus far described the motor resembles an ordinary single phase repulsion motor.

Located between the slots 19 which carry the windings 16 are deep and narrow bars 20. These bars are shown in greater detail in Figs. 3 and 4 and consist of a central member 21 of thin copper and outside members 22 of magnetic material such as sheet iron. These three members are preferably welded together and are located in slots 23 appropriately provided on the secondary member 15. The two outside magnetic members 22 are used merely to fill in the slots which are difficult to stamp out when made very narrow. The active part of the bar which is used in the conductor of the squirrel cage winding is the copper member 21. By the use of this expedient of welding the magnetic members to the copper member it is possible to utilize slightly wider slots in the secondary member so that little difficulty may be experienced in punching them. The magnetic members 22 thus form a part of the magnetic structure of the secondary member 15. This form of conductor is shown in a patent granted to Sven R. Bergman, No. 1,240,018, and assigned to the same assignee as the present application. End rings 24 are provided in each end of the squirrel cage for connecting the bars electrically together.

Due to the fact that comparatively deep and narrow bars are utilized in the squirrel cage, when the motor is started the repulsion motor winding 13 predominates, as the squirrel cage winding has a comparatively high apparent resistance. This apparent resistance is produced by the eddy currents developed in the bars 21. As the motor continues to speed up the squirrel cage exerts a gradually increasing torque. Near synchronism the resistance of the squirrel cage becomes less since there is no longer an intense magnetic field which sweeps across these conductors. The speed thus rises only slightly above synchronism. Furthermore, during the running operation the squirrel cage has but little reactance and the power factor of the motor is maintained at a comparatively high value. During the starting period of the motor the high apparent resistance of the squirrel cage assists materially to produce a high torque.

In Fig. 5, we show a modified form of the windings of the secondary member 15. In this case the definite coil winding 25 is located in one part of the slot 26 having a somewhat irregular shape. The remainder of the slot is occupied by the compound conductor 27 comprising an L-shaped copper member 28 and thin strips of magnetic material 29, 30 and 31. These strips 29, 30 and 31 merely fill in the slot so as to complete the magnetic structure. The active portion of the conductor comprises the L-shaped member 28. This modification operates substantially as the modifications shown in Fig. 1, except that the wide portion of the conductor at the bottom of the L is added. This portion provides a path for the current through the squirrel cage in parallel with the path through the deep bar. This parallel path, however, during the starting of the motor does not permit a high current flow, since it is almost entirely embedded in magnetic material and its reactance is therefore high. However, near synchronism the reactance is reduced considerably and this parallel path is sufficiently good so that it reduces appreciably the total impedance which is opposed to the flow of current through the squirrel cage during running operation.

It is evident from the foregoing description that we have produced a single phase self starting motor having desirable starting and running characteristics. These effects are due to the arrangement of the windings of the secondary member and to the form of the conductors making up the squirrel cage winding.

While we have shown in the accompanying drawings but several modifications of our invention, we do not wish to be limited thereto but aim to embrace in the appended claims all modifications falling fairly within the spirit and scope of our invention.

What we claim as new and desire to secure by Letters Patent of the United States, is:

1. A single phase motor comprising a primary member and a secondary member, a commutated winding carried by the secondary member and a squirrel cage winding also carried by the secondary member, the bars of said squirrel cage winding having an enlarged portion situated below the commutated winding and a relatively reduced portion extending above said commutated winding.

2. A single phase motor comprising a primary member and a secondary rotor member, a commutated winding carried by the secondary member and a squirrel cage winding also carried by the secondary member, the bars of said squirrel cage winding having an enlarged portion situated below the commutated winding and a relatively narrow portion extending to the periphery of the rotor.

3. A single phase motor comprising a primary member and a secondary member, a commutated winding carried by the secondary member, and a squirrel cage winding also carried by the secondary member, said squirrel cage winding having L-shaped conductors, the vertical arm of the L being radial and comparatively narrow.

4. A single phase motor comprising a primary member and a secondary member, a commutated winding carried by the secondary member and a squirrel cage winding also carried by the secondary member, said squirrel cage winding bars extending above and below said commutated winding and being of such form that during the starting period, eddy currents materially increase their apparent resistance.

5. A single phase motor comprising a primary member and a secondary member, a winding having definite coils carried by said member, and a squirrel cage winding also carried by the secondary member, said squirrel cage winding having L-shaped conductors, the vertical arm of the L being radial and comparatively narrow.

In witness whereof, the said SVEN R. BERGMAN has hereunto set his hand this 30th day of July, 1921, and the said ALFRED F. WELCH has hereunto set his hand this 4th day of Aug., 1921.

SVEN R. BERGMAN.
ALFRED F. WELCH.